Oct. 17, 1967  G. H. SANDERS ET AL  3,347,033
AUTOMATIC OBJECT HANDLING APPARATUS
Filed Jan. 21, 1965  6 Sheets-Sheet 4
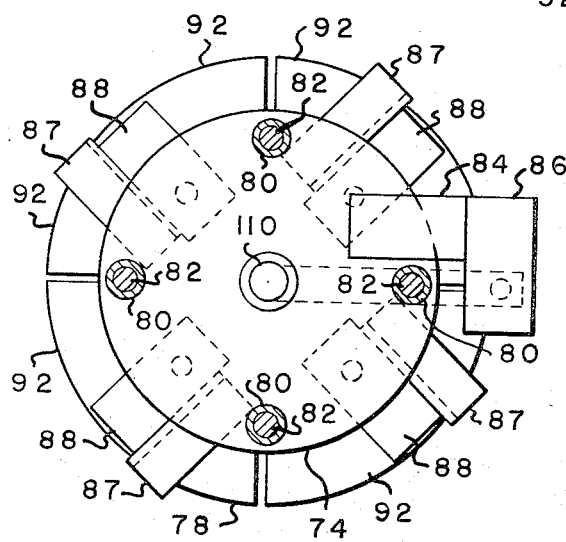
FIG.-6-
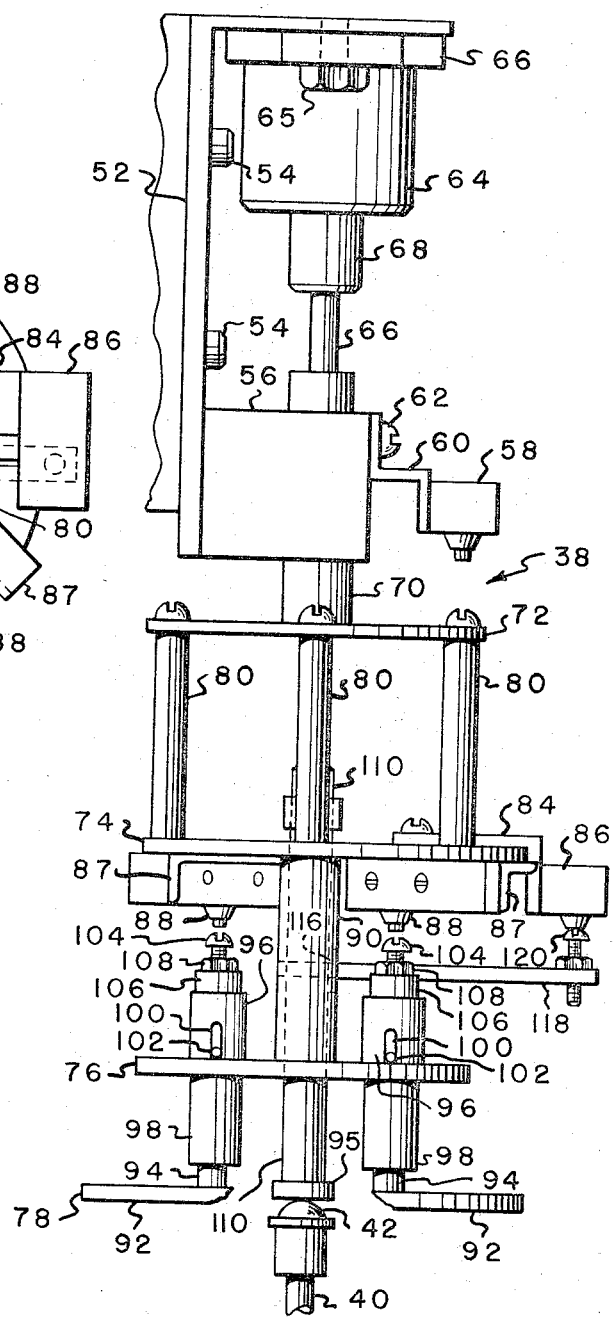
FIG.-7-
INVENTORS
GRADY H. SANDERS
BY  JOHN K. McCOLLOUGH
Earle R. Marden
ATTORNEY

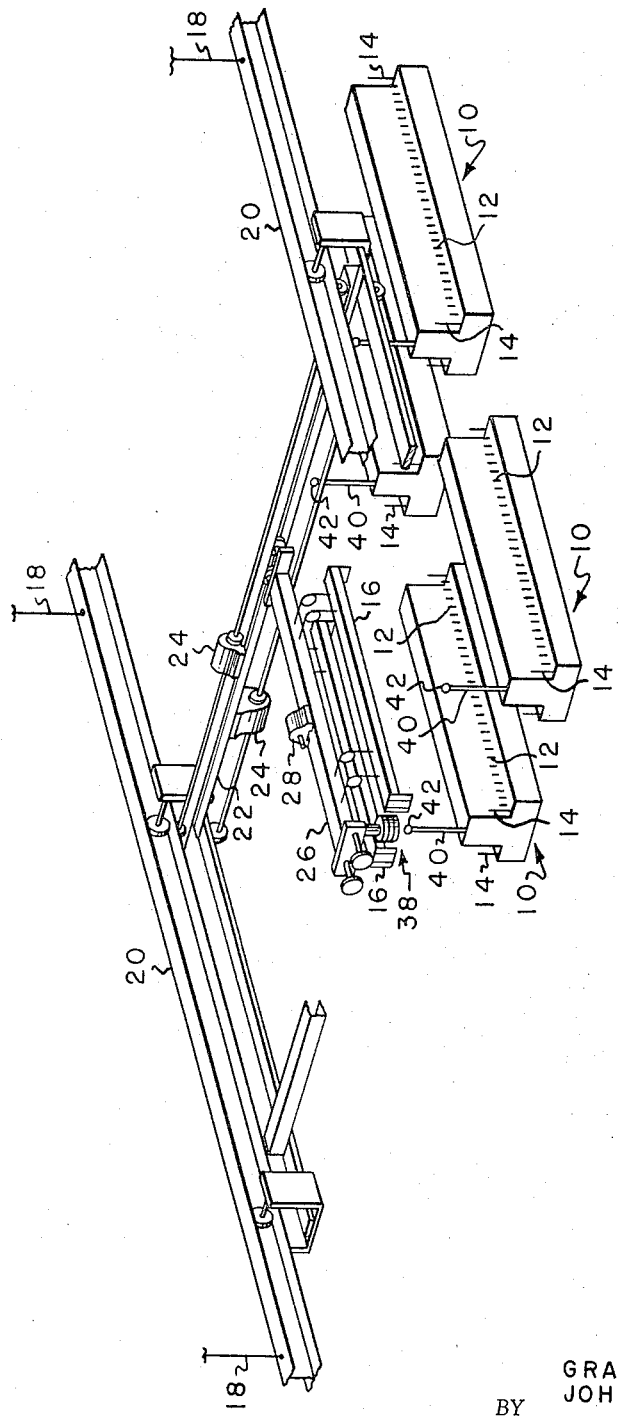

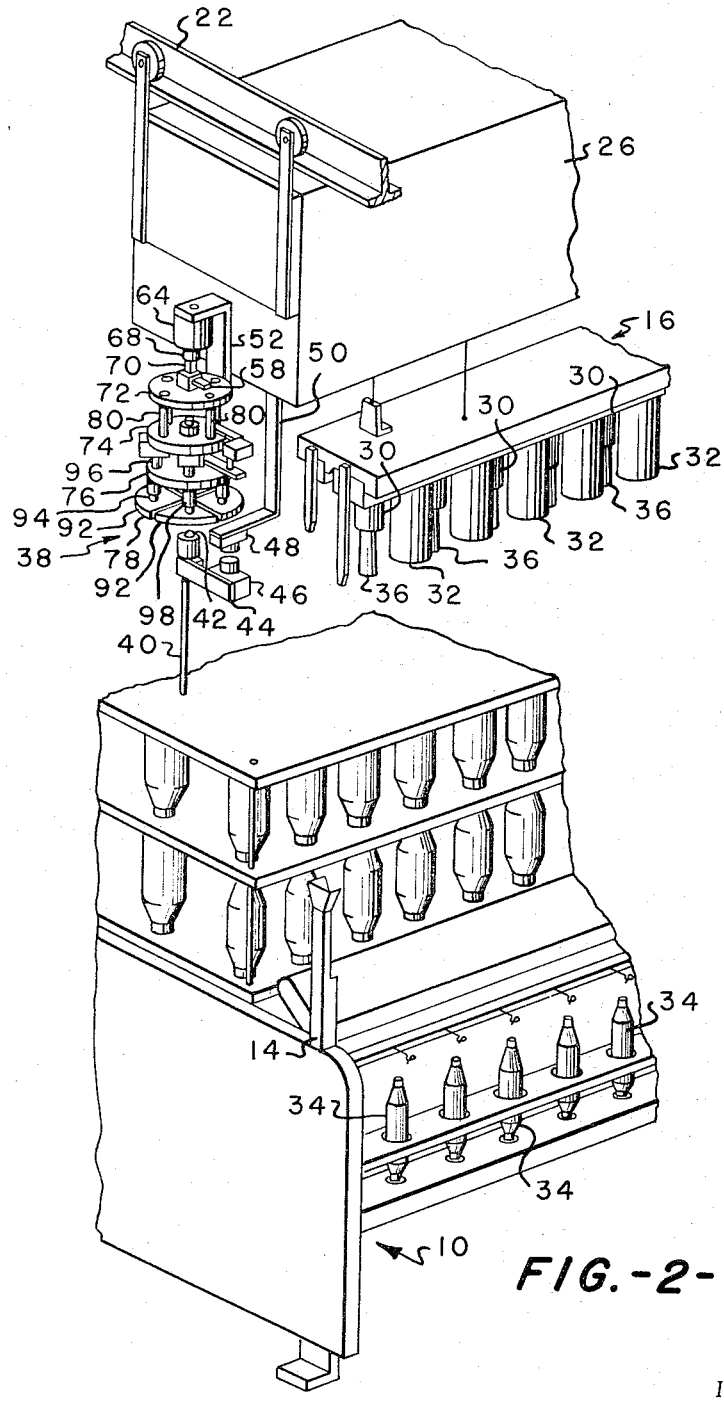
FIG.-2-

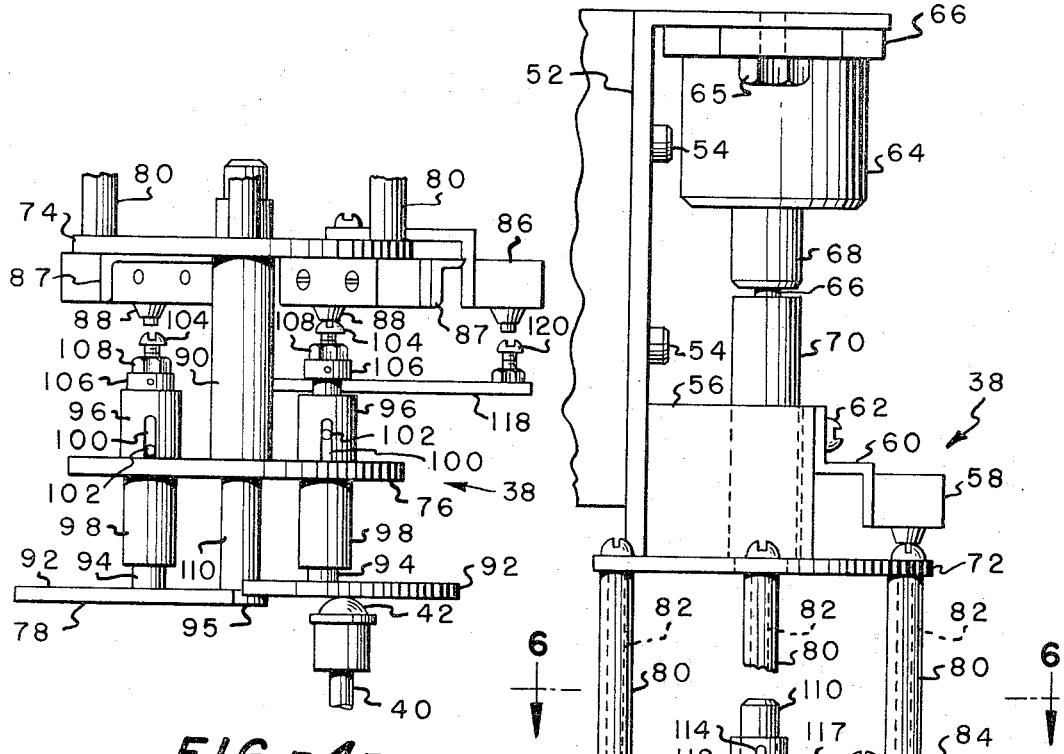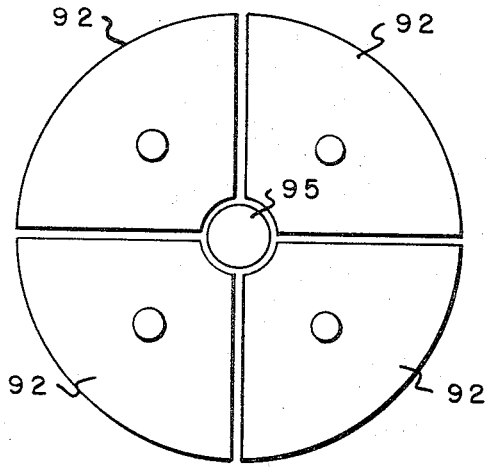

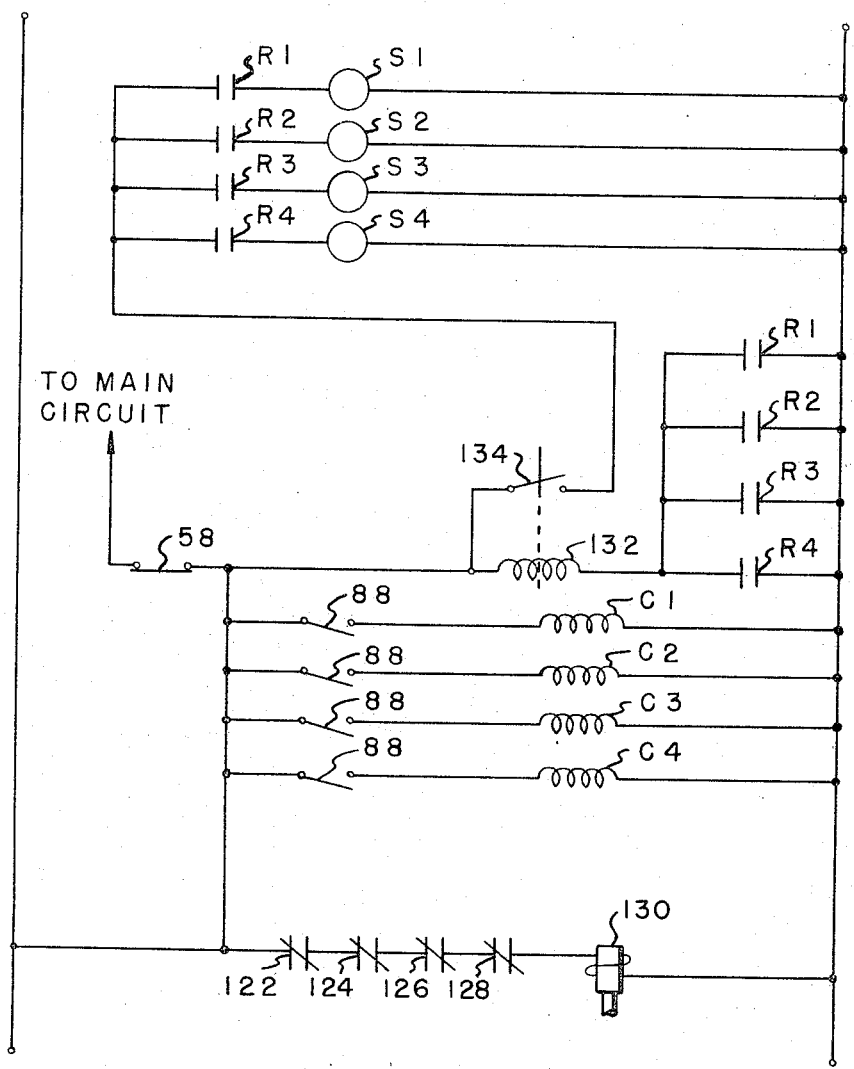
FIG.-8-

Oct. 17, 1967  G. H. SANDERS ET AL  3,347,033
AUTOMATIC OBJECT HANDLING APPARATUS
Filed Jan. 21, 1965  6 Sheets-Sheet 6
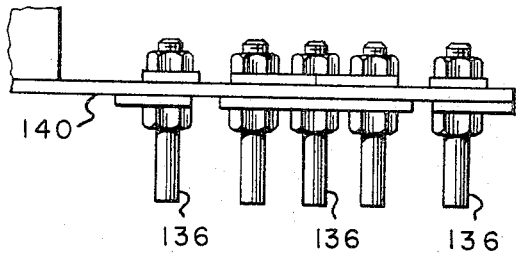
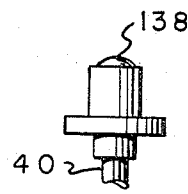
FIG.-9-
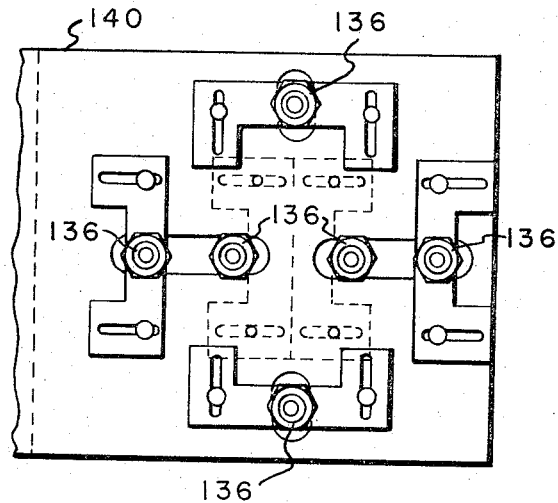
FIG.-10-
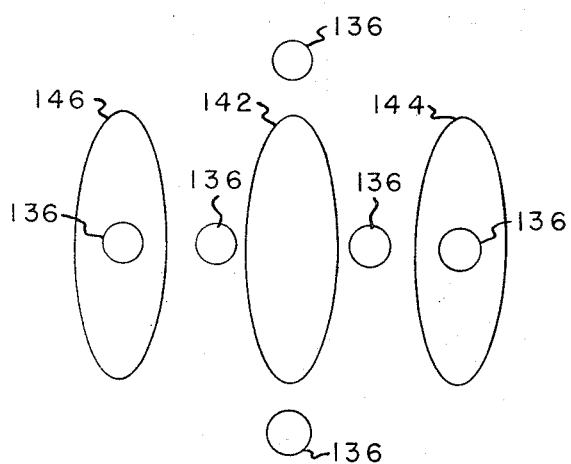
FIG.-11-
INVENTORS
GRADY H. SANDERS
JOHN K. McCOLLOUGH
BY
Earle R. Marden
ATTORNEY

United States Patent Office 3,347,033
Patented Oct. 17, 1967

3,347,033
AUTOMATIC OBJECT HANDLING APPARATUS
Grady H. Sanders and John K. McCollough, Spartanburg, S.C., assignors to Deering Milliken Research Corporation, Spartanburg, S.C., a corporation of Delaware
Filed Jan. 21, 1965, Ser. No. 428,285
20 Claims. (Cl. 57—53)

ABSTRACT OF THE DISCLOSURE

The invention relates to an automatic doffing and donning device employing an overhead rail system with two traveling carriages. The carriage system is jogged into an exact operating position over the bobbins by means of segmented plate members on the carriage system, which plate members contact an upstanding rod on the textile frame and actuate drive means to move the carriage system.

---

This invention relates generally to overhead rail systems which can be automatically located in an exact desired position to transport articles therefrom or to perform a desired operation at such exact position and in particular to an overhead conveying system which is employed to automaticaly doff and don a textile spinning, drawing or like frame and which is automatically positioned in the exact desired location over such frame to perform such operation.

Prior to this invention overhead rail systems to convey all types of articles from one position to another with a minimum of supervision and manual operation were known. These systems have been automated to such an extent that the conveyors will automatically position itself in the general area where the article to be conveyed is picked up or work is to be performed. Normally after the rail system has positioned itself in the general position it is necessary for an operator to manually jog the rail system into the exact location desired. This operation requires the time and skill of an experienced operator and eliminates the possibility of full automation of such system. In U.S. Patent 3,116,586 there is disclosed an arrangement whereby an overhead conveying system is employed to doff and don a textile spinning frame. The disclosed system, in the same manner as set forth above, requires the time and skill of an operator to position the overhead bobbin handling system in the proper position before the bobbins can be doffed and donned from and on, respectively, the desired spinning frame.

Therefore, it is an object of this invention to provide an overhead rail system which will automatically position itself in the exact desired position over the area in which a desired operation is to be performed.

Another object of the invention is to provide an overhead conveying system which can be integrated into a complete automatic system for the conveyance of any desired object.

A still further object of the invention is to provide a bobbin handling and conveying system which will automatically position itself over a spinning, drawing or like frame in an exact desired position so that full bobbins can be doffed from the frame and empty bobbins placed thereon without the assistance of an operator.

Another object of the invention is to provide a spotter system for an overhead conveying system which will automatically and efficiently locate the exact desired position for the overhead conveying system to which it is attached.

Other objects and advantages of our invention will become clearly apparent as the specification proceeds to describe the invention with reference to the accompanying drawings, in which:

FIGURE 1 is an overall schematic illustration of a spinning room having the present invention incorporated therein;

FIGURE 2 is an expanded view of that portion of the conveying system of FIGURE 1 showing the spotter in detail in position over the desired spinning frame;

FIGURE 3 is an enlarged view of the spotting mechanism prior to moving into operative position with the spinning frame;

FIGURE 4 is an enlarged view of the spotting mechanism in one operative position;

FIGURE 5 is a bottom view of the spotter contact plates;

FIGURE 6 is a cross-section view taken on line 6—6 of FIGURE 3;

FIGURE 7 is an enlarged view of the spotter when the spotter and the conveying system are in the exact desired position;

FIGURE 8 is a schematic circuit diagram of the spotter electrical system;

FIGURES 9 and 10 show a modified version of a portion of the spotter mechanism with FIGURE 10 being a bottom view of FIGURE 9; and FIGURE 11 is a schematic view showing the general arrangement of the modified spotter arrangement of FIGURES 9 and 10 in relation to the light signal from the spinning frame.

In the preferred form of the invention as illustrated the new overhead rail system is disclosed as a system to automatically and precisely locate a bobbin doffer and donning apparatus in position over a spinning frame. It should be understood that this is only the preferred use of the invention and that the herein disclosed invention is applicable to any overhead rail systems in which it is desired to precisely locate the rail system over any desired point. It should be further understood that the disclosed system can also be employed in any textile overhead conveying system which is employed to convey articles from one position to another automatically.

Looking now to the drawings and especially FIGURES 1 and 2 the invention is illustrated as installed in a textile spining room having a plurality of spinning frames 10 which are longitudinally arranged in parallel side-by-side rows. The take-off spindles which are to be doffed and donned by the apparatus of the present invention are schematically indicated at 12. It will, of course, be appreciated that only a portion of the spinning frames of a conventional spinning room are illustrated in these figures, a sufficient number being shown to indicate merely the applicability and operation of the present invention with respect to a grouping of spinning frames arranged in a conventional manner of orientation. Each of the spinning frames may have guide parts 14 disposed at opposite ends of the spinning frames for the purpose of guiding two doffing and donning assemblies 16 into proper position for doffing yarn packages and donning empty bobbins from and onto the spindles 12 of the spinning frames 10.

Supported above a plurality of rows of the spinning frames 10 by main support rods 18 suspended from the ceiling (not shown), are two longitudinally disposed parallel rails in the form of I-beams 20 which are aligned in parallel relation with the rows of spinning frames. These parallel rails 20 may preferably extend along the length of the spinning room from one end of the rows of spinning frames to the opposite end of these rows. These parallel rails serve as guides and supports for a longitudinal movable main carriage 22 driven by motors 24 which carries a transversely movable carriage 26 supported thereon for transverse movement by motors 28 from row to row of the spinning frames 10.

Suspended from the transversely movable carirage 26 are the doffing and donning assemblies 16 which carry a plurality of empty bobbin holders 30 and a plurality of full bobbin holders 32 for the purpose of doffing full bobbins 34 from the spinning frame 10 and replacing them with empty bobbins 36. The operation of the doffing and donning assemblies 16 as well as carriages 22 and 26 are not per se part of the invention. The operation of such devices are well known in the art as exemplified in U.S. Patent 3,116,586.

Prior to this invention the main carriage 22 and the transversely movable carriage 26 were automatically positioned over the frame to be doffed. Then it was necessary for an operator to manually jog both the main carriage 22 and the transversely movable carriage 26 in order to position the assemblies 16 in the exact position to properly doff the spinning frame. To eliminate this manual operation and to position the assemblies 16 in the exact correct position over the spinning frame 10 for doffing a spotter assembly, generally designated 38, is provided. Not only does the spotter assembly automate this portion of the spinning cycle but allows full automation of the spinning and winding cycle in the production of textile yarn.

To cooperate with the spotter in a manner hereinafter explained is a rod member 40 mounted on the end of each spinning frame in any suitable manner. Located at the top of each rod member 40 is a spring loaded ball member 42, preferably made from steel. In FIGURE 2 there is also shown a bracket member 44 connected to the rod member 40 which supports a light source 46 at the end thereof to operate with the photocell 48 suitably supported thereabove on the carriage 26 by support arm 50.

The spotter, as shown in detail in FIGURES 3–7, is supported by angle iron member 52 which is mounted to the carriage member 26 by suitable means such as bolts 54. Mounted on and adjacent the bottom of the angle iron member 52 is a U-shaped bracket 56 which supports a switch 58 connected thereto through bracket member 60 mounted on the U-shaped bracket 56 by suitable means such as screws 62. The operation of switch 58 will be explained hereinafter.

A solenoid actuated pneumatic piston 64 is mounted to horizontal leg of the angle iron member 52 by suitable means such as bolts 65 projecting through the flange 66 of the piston 64. Actuation of piston 64 (FIGURE 7) moves piston rod 66 downwardly through cylindrical guide collar 68 to force cylindrical support member 70 downward to move the spotter actuating assembly downward into position adjacent the rod member 40 when the doffer is ready to be placed in the exact position over the frame. The spotter actuating assembly consists basically of disc member 72 connected to cylindrical support member 70, switch support member 74, intermediate disc support member 76 and segmented switch actuation member 78.

Disc member 72 is rigidly secured to and spaced from switch support member 74 by a plurality of hollow rod members 80 spaced around the periphery of the members 72 and 74 and through which elongated bolts 82 project and screw into the switch support member 74. Mounted to the top of switch support plate 74 is an angle shaped bracket member 84 which supports switch 86 attached thereto outwardly from the support plate 74. Mounted on the bottom of switch support plate 74 are bracket members 87 which support switches 88. The number of switches 88 corresponding to the number of segments of actuating member 78, which in this instance, is four.

Switch support plate 74 is connected to and spaced from intermediate support plate 76 by a hollow cylindrical member 90 welded or otherwise secured to both plates. Depending below the intermediate support plate 74 and supported thereby is switch actuating member 78.

Switch actuating member 78 in the preferred form of the invention consists of four identical segments 92 spaced around a round center button 95. As pointed out above the number of segments 92 correspond to the number of switches 88. It has been found that four such segments work very well but other numbers of segments and switches may be employed within the scope of the invention.

Each of the segments 92 have a tubular member 94 connected thereto which is slidably received in collars 96 and 98 connected above and below, respectively, the intermediate support member 76. Collar 96 has an elongated opening 100 therein just above the top surface of the plate 76 and extending in the axial direction of the tubular member 94 to accommodate movement of the pin 102 connected to the tubular member 94. Pin 102 freely supports segments 92 on the plate 76 and in cooperation with collar 96 and 98 and opening 100 allows vertical movement of the segment. Mounted on top of the sliding tubular member 94 is a switch actuating member 104, which in the preferred embodiment is a screw which makes the switch 88 in the extreme upward position of the segments 92 and the tubular member 94. A collar member 106 and nut 108 are provided on top of collar 96 to allow adjustment of screw 104 in relation to the switches 88.

Round center button 95, like segments 92, has a tubular member 110 connected thereto which slides in hollow cylindrical member 90 and is secured in position by pin 112 connected thereto and supported on the top of switch plate 74 in elongated slot 114 in the hollow collar 117 mounted on top of the switch plate 74. Elongated slot 114 allows upward movement of the button 95 and tubular member 110 within the extremes of the slot. A further elongated slot 116 is provided in the wall of the hollow cylindrical member 90 to accommodate actuating arm 118 connected to the tubular member 110 so that on upward movement of the button 95 and tubular member 110 actuating arm 118 will also move upward causing switch actuating member 120 to engage switch 86.

Assume for the sake of discussion the doffer assembly has assumed the position shown in FIGURE 3 where the spotter assembly 38 is not lined up so that the button 95 is in direction line with the rod 40 and ball 42. This position is caused by the main control circuit (not shown) for the carriages 22 and 26. Normally closed switches 122, 124, 126 and 128 are in the main control circuit and are all closed when the main control circuit has positioned the carriages in the general position over the spinning frame. When the carriages have stopped, as in the position indicated in FIGURE 3, switches 122, 124, 126 and 128 will be closed completing the circuit to solenoid valve 130 to supply air to piston 64 causing the piston 64 to push piston rod 66 in the downward direction forcing the spotter actuating assembly downward into operative position as indicated in FIGURE 4. At the same time, disc plate 72 is moved away from the switch 58 thereby allowing switch 58 to open breaking the main circuit to the carriages so that the carriages can only be moved by the actuation of switches 88 in order to prevent damage to the spotter actuator assembly by hitting some object on the spinning frame due to accidental movement of the carriages.

Looking now to FIGURE 4 it can be seen that the movement of the spotter actuating assembly downward caused the engagement of one of the segments with the ball member 42 pushing the contacted segment in the upward direction thereby sliding the tubular member upward to a position where screw 104 engages the corresponding switch 88. Looking at FIGURE 8 it can be seen that the closing of any switch 88 will energize the coil C1, C2, C3 or C4 in series therewith to close the corresponding relay R1, R2, R3 or R4. The closing of any of the relays R1, R2, R3 or R4 simultaneously energizes the corresponding starter S1, S2, S3 or S4 for the desired carriage motor and energizes the coil 132 for the timer cam motor which operates the switch 134 to control the length of energization of any of the starters S1, S2, S3 or S4. The timer cam motor is so selected that the starters S1, S2, S3 or S4 are energized for only a short period of time so that the carriage will only jog a short distance and thereby not overshoot. This jogging and contacting of the segments 92 by the ball 42 continues until the ball member 42 contacts the center button 95 and does not contact any of the segments 92. When this position is reached the doffing and donning assemblies 16 are in the correct position to doff and don the desired spinning frame.

When the carriage 26 has reached the above described desired position as shown in FIGURE 7 the center button 95 along with tubular member 110 will be pushed upwardly until contactor or screw 120 closes switch 86 which signals the main doffer circuit that the doffer is in the required position so that the doffing and donning assemblies 16 can be accurately employed to doff full bobbins from the spindles 12 and replace them with empty bobbin 36. The doffing of the spinning frame does not take place when the switch 86 is actuated. Switch 86 merely signals that the doffer is in correct position. Looking at FIGURE 2, doffing and donning of the spinning frame takes place when the switch 86 has been actuated and the light source 46 has come on indicating that the spinning frame is ready to be doffed. When light source 46 comes on photocell 48 picks up the light signal and proceeds to initiate doffing of the frame since the actuation of switch 86 has indicated that the doffing and donning assemblies are in the proper position.

As pointed out previously motors 24 drive the main carriage 22 and motors 28 drive the transverse movable carriage 26. Preferably on each carriage there is one motor to drive the carriage in reverse and one motor to drive the carriage in a forward position. Starters S1, S2, S3 and S4 are so selected that each starter controls one basic function of one carriage. As an example starter S1 starts the forward motor of the main carriage, and S2 starts the reverse motor of the main carriage. Therefore, the segments 92 and switches are so located that adjacent segments actuate motors on different carriages. In other words it is possible to jog both carriages at the same time but it is not possible to actuate both the forward and reverse motors of the same carriage.

When the spinning frame has been doffed and empty bobbins replaced on the spindles a timer, not shown, controlled by the main doffer circuit will open one of the switches 122, 124, 126 or 128 thereby deenergizing the solenoid valve 130 to cause the piston 64 to retract the piston rod 66 whereby the disc plate 72 will close switch 58 allowing the doffer to once again be connected to the main doffer circuit. Then the doffer can be moved automatically or manually to another position in the spinning room.

Looking now to FIGURES 9-11 there is shown a modification of the segment-switch arrangement employed in the preferred embodiment of FIGURES 1-8. In this embodiment the segments 92 and the switches 88 will be replaced by photocells 136. The steel ball 42 on top of the rod 40 will then be replaced by a light source 138. The photocells 136 will be mounted on a plate 140 connected directly to the carriage 26 thereby eliminating the use of the angle plate 62, piston 64 and all the equipment depending therefrom. The switch 58 will also be eliminated since there will no longer be spotter equipment hanging down low over the spinning frame which can be damaged by accidental displacement of the carriages. The function of button 95 and switch 86 can then be performed either by the light source 138 and another photocell or a separate light source and photocell arrangement.

As in the preferred embodiment of FIGURES 1-8 the starters for the carriage motors will be energized according to the photocell energized by the light source 138. It has been found that more photocells 136 than switches 88 were needed due to the elongated configuration of the light beam from the light source. Looking at the schematic set up of the photocells in FIGURE 11 the desired position 142 of the light source 138 is shown between the innermost photocells. If the doffer should stop so that the light for the light source assumed position 144 of 146 it can be seen if we did not provide the additional photocells that the light source would not be detected. Therefore, two additional photocells 136 have been provided.

The operation of the light source and the photocells operates in similar manner as the switches 88 and the ball 42 in that the carriages are jogged from position to position depending on the photocell picking up the light source until the carriage 26 reaches the position where the light source assumes the position 142 shown in FIGURE 11. This position is the desired position for doffing and donning the spinning frame.

The herein disclosed improvements in overhead traveling rail equipment provides a system which will automatically and accurately locate such equipment in the exact desired position without the services of an operator. Furthermore, such disclosed improvements to overhead traveling rail equipment allows such equipment to be used in a completely automated system. In the preferred embodiments of the invention it has been possible to doff and don full and empty bobbins on a spinning frame with a minimum of supervision.

Although we have described in detail the preferred embodiments of our invention, it is contemplated that many changes may be made without departing from the scope or spirit of our invention and we desire to be limited only by the claims.

That which is claimed is:

1. An overhead traveling rail system comprising: a movable overhead carriage system, said carriage system including at least two carriages, one of said carriages being movable in a direction normal to the direction of travel of the other of said carriages, drive means to drive said carriages, an object below said carriage system to be treated by said system, a first means operably associated with said object to actuate said carriage system and a second means on said carriage system actuated by said first means to automatically jog said carriages into a predetermined location with respect to said object.

2. An overhead traveling rail system comprising: a movable overhead carriage system, drive means to drive said overhead carriage system, an object below said carriage system to be treated by said system, a first means operably associated with said object to actuate said carriage system and a second means on said carriage system actuated by said first means to automatically position said carriage system in a predetermined location with respect to said object, said first means including an upstanding rod like member and said second means including a plurality of plate segments mounted on said carriage system, each of said plate segments being operably associated with carriage drive means to actuate said drive means when contacted by said rod like member.

3. A bobbin handling arrangement for handling bobbins comprising: a bobbin-using textile processing device, a movable carriage system above said bobbin-using textile processing device and having bobbin doffing and donning equipment connected thereto, said carriage system including at least two carriages, one of said carriages being movable in a direction normal to the direction of travel of the other of said carriages, drive means connected to said carriage system to drive said carriages, a first means on said bobbin-using textile processing device to actuate said carriage system and a second means operably associated with said drive means and actuated by said first drive means to automatically jog said carriages into the exact position over said bobbin-using textile processing device to doff and don bobbins thereon by said doffing and donning equipment.

4. A bobbin handling arrangement for handling bobbins comprising: a bobbin-using textile processing device, a movable carriage system above said bobbin-using textile processing device, a movable carriage system above said bobbin-using textile processing device and having bobbin doffing and donning equipment connected thereto, drive means connected to said carriage system to drive said carriage system, a first means on said bobbin-using textile processing device to actuate said carriage system and a second means on said carriage system to automatically position said carriage system over bobbin-using textile processing device in the exact position to doff and don said device by said doffing and donning equipment, said first means including a rod like member connected to said bobbin-using textile processing device and projecting upwardly therefrom, said second means including segmented plate members which contact said rod like member when said carriage system is positioned generally over said bobbin-using textile processing device, said segmented plate members actuating said drive means to move said carriage system when it engages said rod member.

5. A bobbin handling arrangement for handling bobbins comprising: a bobbin-using textile processing device, a movable carriage system above said bobbin-using textile processing device and having bobbin doffing and donning equipment connected thereto, drive means connected to said carriage system to drive said carriage system, a first means on said bobbin-using textile processing device to actuate said carriage system and a second means on said carriage system to automatically position said carriage system over bobbin-using textile processing device in the exact position to doff and don said device by said doffing and donning equipment, said first means including a rod like member connected to said bobbin-using textile processing device and projecting upwardly therefrom, said second means including four separate segments of a circle arranged in a circular path, one or more of said segments contacting said rod like member to actuate said drive means to move said carriage system when said carriage system has been positioned in the general location over said bobbin-using textile processing device.

6. The structure of claim 5 wherein said four segments are arranged to provide an opening in the center thereof, a button member in said opening and means operably associated with said button member to signal said carriage system that the carriage system is positioned in the exact desired position when said rod like member contacts said button member.

7. A spotter for an overhead traveling rail system comprising: a frame, a plurality of segmented plate members slidably secured in said frame, switch means operably associated with each of said segmented plate members, and means connected to said segmented plate members to actuate said switch means when one of said plate members is slid in said frame.

8. The structure of claim 7 wherein said plate members are operably associated with a piston member, said plate members being positioned in operative position by said piston member when said piston member is actuated.

9. The structure of claim 8 wherein said segmented plate members are arranged in a circle to form an opening between said plate members, a slidably mounted button member in said opening, switch means in operative relationship with said button member and means connected to said button member to actuate said switch means when said button member is slid.

10. The structure of claim 1 where said first means includes a light source and said second means includes a photocell actuated by said light source.

11. The structure of claim 1 wherein said first means includes a light source and said second means includes at least four photocells spaced from one another in such a manner that the beam from said light source will shine on a point between all four photocells when said carriage position is automatically positioned in the correct position.

12. The structure of claim 2 wherein each of said segments are slidably mounted, switch means operably associated with said segments, and means on said segments to engage said switch means to actuate said drive means when at least one of said segments is slid by engagement wth said rod like member.

13. The structure of claim 12 wherein said plate segments are arranged substantially in a circular path and form an opening in the center of said segments, a slidably mounted button like member in said opening, and means operably associated with said button like member to signal when said carriage is in the desired position when said means is actuated by engagement of said button like member with said rod like member.

14. The structure of claim 3 wherein said first means includes a rod like member connected to said bobbin-using textile processing and projecting upwardly therefrom.

15. The structure of claim 14 wherein said first means includes a light source on said rod like member and said second means includes a photocell actuated by the light beam from said light source to actuate said drive means to move said carriage system.

16. The structure of claim 14 wherein said second means is automatically positioned adjacent said rod like member when said carriage system is moved into a general position over said bobbin-using textile processing device.

17. The structure of claim 4 wherein said segments are connected to a pneumatically actuated piston, said piston being automatically actuated to lower said second means into position adjacent said rod like member when said carriage system is positioned in a general position over said bobbin-using textile processing device.

18. The structure of claim 4 wherein said segments are slidably mounted and operably associated with switch means operably associated with said drive means and means to allow said segments to slide upwardly to actuate said switch means to actuate said drive means when said segments contact said rod like member.

19. The structure of claim 18 wherein said segments are arranged in a circular path to form an opening in the center of said segments, a slidably mounted button like member in said opening and means operably associated with said button like member to signal said carriage system when said carriage system is exactly positioned for doffing and donning said bobbin-using textile processing device.

20. The structure of claim 19 wherein said carriage system includes at least two carriages, one of said carriages being movable in a direction normal to the direction of travel of the other of said carriages, said doffing and donning equipment and said second means being mounted on said one carriage.

References Cited
UNITED STATES PATENTS

| | | | |
|---|---|---|---|
| 2,039,473 | 5/1936 | Bennington. | |
| 2,980,264 | 4/1961 | Burt et al. | 212—132 |
| 3,116,586 | 1/1964 | Ingham | 57—52 |

FOREIGN PATENTS 1,273,673  9/1961  France.

FRANK J. COHEN, *Primary Examiner.*

JOHN PETRAKES, *Examiner.*